United States Patent Office 3,468,193
Patented Sept. 23, 1969

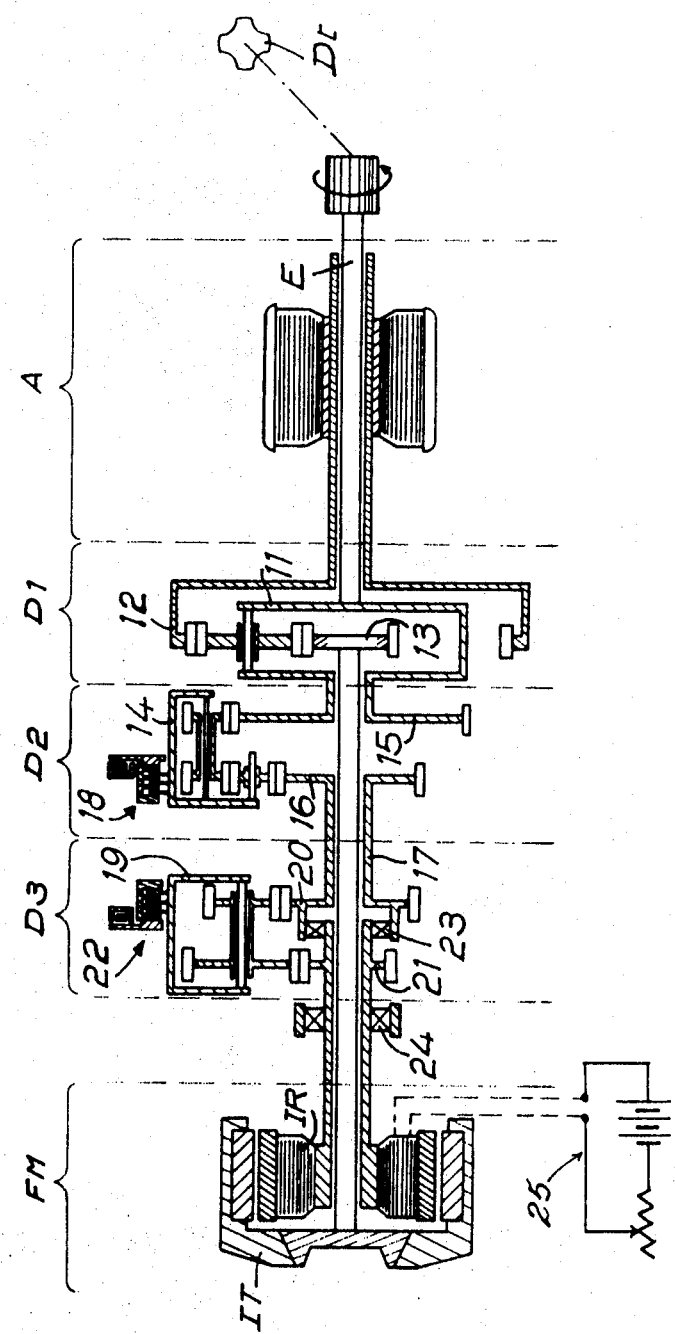

3,468,193
ELECTRO-MECHANICAL SYSTEM FOR DRIVING AT CONSTANT SPEED
Gérard M. P. L. O'Mahony, Ville d'Avray, France, assignor to Societe anonyme dite: Auxilec, Colombes (Hauts-de-Seine), France, a French society
Filed Dec. 18, 1967, Ser. No. 691,541
Claims priority, application France, Jan. 6, 1967, 90.228
Int. Cl. F16h *37/06*
U.S. Cl. 74—686      3 Claims

ABSTRACT OF THE DISCLOSURE

The present invention relates to electro-mechanical systems for driving a device at a constant speed and of the kind that comprises a variable-speed input shaft, a first differential having a satellite holder rotated by the input shaft, an output shaft rotated by a planet wheel of said first differential, an electromagnetic brake constituted by a first rotor rotated by a second planet wheel of the first differential and by a second rotor securely connected to a shaft mounted on a framework with the interposition of a free wheel: a second differential is provided that has an input planet wheel securely connected to the satellite holder of the first differential, the output planet wheel of which is rotatable in a direction opposite that of the input planet wheel and the satellite holder of which can be immobilised by a first electro-brake and a suitable electrical circuit for controlling the variable slip of the electro-magnetic brake in order to obtain a constant speed of rotation of the output shaft. The invention seeks to reduce the losses associated with the slip of the brake by keeping this slip at a small value, and consists in interposing, between the output planet wheel of the second differential and the shaft securely connected to the second rotor of the electro-magnetic brake, a change-speed device in such a way that the rotor retains, for the shaft of the second rotor of the electro-magnetic brake, whatever the speed of rotation of the output planet wheel of the second differential, a speed of rotation with respect to the shaft of the first rotor that is lower than a predetermined slip speed of the electro-magnetic brake.

---

The present invention realtes to continuous change speed systems, the input shaft of which rotates at a speed which may vary within a wide range and the output shaft of which rotates at a constant speed.

In a known arrangement, there is provided an electro-mechanical system for the constant speed drive, which comprises a variable-speed input shaft, a differential whose satellite holder is rotated by the input shaft, an output shaft rotated by a first planet wheel of this differential, a rotor of an electro-magnetic brake rotated by a second planet wheel of the differential, a suitable electrical circuit controlling the variable slip of said electro-magnetic brake in order to obtain a constant rotational speed of the output shaft, and a device for transmitting movement between the input shaft and the electro-magnetic brake designed either to drive a second rotor of the electro-magnetic brake in a direction opposite that of the input shaft or to immobilise it according to whether the value of the speed of the input shaft is lower or higher than a predetermined intermediate value between the limiting values of this speed.

A system of this type operates very well and is compatible with other devices for driving at constant speed if the slip of the electro-magnetic eddy current brake does not exceed 30% for example.

In the case where the range of speed variation of the input shaft is very wide, for example from 1 to 2, and for fairly high powers, the losses associated with the slip of the eddy current brake become very considerable.

The present invention has for an object considerably to reduce the losses associated with he slip of the eddy current brake by keeping the slip at a small value, for example 30%, this being for an extended range of speed variation of the input shaft of the drive system.

To this end, the invention consists in an electro-mechanical system for driving at constant speed, of the type comprising a variable-speed input shaft, a first differential, the satellite holder of which is rotated by the input shaft, an output shaft rotated by a planet wheel of this differential, an electro-magnetic brake, constituted by a first rotor, rotated by the planet wheel of the differential and by a second rotor securely connected to a shaft mounted on a frame with the interposition of a free wheel, a second differential, the input planet wheel of which is securely connected to the satellite hoder of the first differential, the output wheel of which may rotate in the direction opposite that of the input planet wheel and the satellite hoder of which may be immobilised by a first electro-brake, and a suitable electrical circuit controlling the variable slip of said elecro-magnetic brake in order to obtain a constant speed of rotation of the output shaft, and is characterised in that between the output planet wheel of the second differential and the shaft which is securely connected to said rotor of the electro-magnetic brake there is inserted a change speed device so as to retain for the shaft of the second rotor of the electro-magnetic brake, whatever the speed of rotation of the output planet wheel of the second differential, a rotational speed with respect to the shaft of the first rotor, lower than a given speed of slip of the electro-magnetic brake.

According to another feature of the invention, the change speed device is constituted by at least one unit for halving the speed of rotation of the shaft of the second rotor, so as to communicate to the shaft of the second rotor of the electro-magnetic brake for *n* units of this type inserted in cascade between the shaft of the second rotor and the output planet wheel of the second differential, *n*+1 speeds of rotation for the same speed of rotation of the output planet wheel of the second differential.

Other characteristics and advantages of the invention will appear from the following description of an embodiment of a system of driving at constant speed, this description being given solely by way of example and with reference to the accompanying drawing whose single figure schematically shows an electro-mechanical change speed system according to the invention intended for driving an alternator at constant speed.

Referring now to the drawing, this shows an input shaft E that rotates at a variable speed.

The shaft E is arranged to rotate with a planet gear holder plate 11 of a first differential D1 which may be of any known type, and particularly, of the epicyclic type. The ring gear 12 of the differential D1 rotates an alternator A. The sun gear 13 of the differential D1 is arranged to rotate with the armature IT of an eddy current brake designated hereinafter as motor brake FM and the inductor IR of which is energised with direct current by any suitable means, such as schematically shown at 25. The inductor IR is connected to the holder 11 by a movement transmission device constituted by:

(a) A second differential D2, the planet gears of the carrier 14 of which engage on the one hand with a sun wheel 15 securely connected to the holder 11 of the differential D1 and with a sun wheel 16 secured to an intermediate shaft 17. In addition, the holder 14 of the differential D2 may be held stationary by means of an electro-brake 18.

(b) An epicyclic train D3, the planet gears on holder 19 engaging on the one hand with a sun wheel 20 securely connected to the intermediate shaft 17 and with another sun wheel 21 securely connected to the shaft carrying the inductor IR. The holder 19 may also be held stationary by means of a second electro-brake 22.

Moreover, a one-way clutch or free wheel 23 is positioned between the shaft 17 and the shaft of the inductor IR, this free wheel enabling the shaft of the inductor IR to be driven by the intermediate shaft 17 only in the direction opposite that of the input shaft E.

Finally, between the shaft of the inductor IR and the framework of the device there is positioned a one-way brake or free wheel 24 permitting the rotation of the shaft of the inductor only in the direction opposite that of the input shaft E.

Finally, a tachometric detector Dt is driven at a rotational speed proportional to the speed of drive of the input shaft and controls the operation of the two electro-brakes 18 and 22.

The operation of the above described device essentially comprises three successive phases according to whether the speed Ve of the input shaft is between the maximum value $V_{max}$ of the input shaft and a low value V1 or whether the speed Ve is between the value V1 and a value V2 lower than V1, or whether finally the speed Ve is between the value V2 and a minimum value $V_{min}$.

During the first range of speeds of the input shaft E, i.e. for the high speeds, the electro-brakes 18 and 22 are not energised. The shaft of the inductor IR is immobile and the holders 14 and 19 rotate "off load."

The armature IT then rotates in the same direction as the input shaft E which thus drives the alternator A by means of the differential D1 acting as a mechanical transmission device with variable ratio (according to the slip of the brake motor FM with which the energisation of the inductor IR is consequently regulated).

The second range concerns average speeds, and only the electro-brake 18 is energised. The holder 14 is immobilised and the shaft of the inductor IR is driven by the sun wheel 15 and rotates in the direction opposite the direction of rotation of the input shaft and in a given range of speeds.

It is then possible to rotate the armature IT of the brake motor FM in the direction opposite that of the input shaft E. Under these conditions, in order to maintain constant the speed of the alternator A, the speed of the armature IT is varied as a function of the speed of the input shaft E.

The role of the assembly composed of the epicyclic train D3, free wheel 23 and intermediate shaft 17, is that of an "over drive" enabling a new and third range of rotational speeds of the shaft of the inductor IR to be obtained when the intermediate shaft 17 reaches a low speed limit. To this end additionally, it is sufficient to additionally energise the electro-brake 22. The shaft of the inductor IR may then rotate at a speed greater than that achieved in the case of the second range; the armature IT may then also rotate at a greater speed so as to always drive the alternator A at its normal speed without, in the present case, exceeding a rate of slip, for example of 30% between the armature IT and the inductor IR.

The following table groups the theoretical operational characteristics of the various members of the device in the course of the three operational phases:

| | Speed Ve of the input shaft | Speed IR | Speed IT | Speed A |
|---|---|---|---|---|
| Range 1: Non-energised electro brakes, high input speeds. | $V_{max}$ | 0 | $V_{max}$ | $V_A$ |
| | V1 | 0 | n | $V_A$ |
| Range 2: Electro-brake 18 energised, average input speeds. | V1 | $-K_2V1$ | n | $V_A$ |
| | V2 | $-K_2V2$ | $-K_2V2+n$ | $V_A$ |
| Range 3: Electro-brakes 18, 22 energised, low input speeds. | V2 | $-K_2K_3V2$ | $-K_2V2+n$ | $V_A$ |
| | $V_{min}$ | $-K_2K_3V_{min}$ | $-K_2K_3V_{min}+n$ | $V_A$ |

In this table, the + sign indicates the direction of rotation which is that of the input shaft E.

The − sign indicates the reverse direction of rotation.

$K_2$ is the transmission ratio of the differential D2 when the electro-brake 18 is energised.

$K_3$ is the transmission ratio of the differential D3 when the electro-brake 22 is energised.

n is the minimum slip speed of the electro-magnetic brake FM.

Thus with a system of this type, either the range of speed variation of the input shaft E may be extended, as in the present case, whilst retaining a slip speed of the electro-magnetic brake FM lower for example than 30%, or a more restricted range of speed variation of the shaft E may be retained and the losses of the electro-magnetic brake may be diminished just as much by reducing the maximum slip speed obtained.

In both cases, as many new speed ranges of the second rotor IR of the electro-magnetic brake FM are introduced into the system as there are units similar to that constituted by the assembly of the train D3, free wheel 23, shaft 17 and mounted in cascade between the shaft of the second rotor IR and the sun wheel 16 of the second differential D2. These new ranges of speeds of the inductor IR in the present case are located on this side of the two initial ranges obtained with the differentials D1 and D2.

Finally, according to another modification, one or more speed selector devices such as that described above may also be adapted, in order to obtain the same results, between the holder 11 of the differential D1 and the input wheel of the differential D2.

I claim:

1. In a drive mechanism having a first planetary gear set of first planetary wheel carrier, first sun wheel and ring gear, a variable speed input shaft connected to said carrier, an output shaft rotated by said ring gear, an electro-magnetic brake having relatively rotatable members and controllable electro-magnetic means for controlling slippage therebetween, one of said members being fixedly connected to said first sun wheel, and a first selectively operable unit for drivingly connecting said carrier to the other of said members for driving said other member in a direction opposite that of said input shaft at a first speed: the improvement comprising; a second selectively operable change speed unit for drivingly connecting said first selectively operable means to said other member to drive the same in a direction opposite to that of said input shaft but at a second speed.

2. A device as defined in claim 1 wherein at least one of said units effects a speed reduction therethrough of one-half.

3. A device as defined in claim 1 wherein said second unit comprises an epicyclic gear train having a planet gear drivingly connected to an intermediate shaft which is in turn drivingly connected to an output element of said first unit; said planet gear being drivingly connected to said other member; said intermediate shaft being drivingly connected to said other member by a one-way clutch device; said planet gear being mounted on a rotatable carrier; and selectively operable means for holding said carrier against rotation.

References Cited

UNITED STATES PATENTS

| | | | |
|---|---|---|---|
| 1,515,322 | 11/1924 | Ahlm | 74—686 |
| 1,870,076 | 8/1932 | Thomson | 74—686 X |
| 2,330,821 | 10/1943 | Finzi | 74—675 |
| 2,669,132 | 2/1954 | Lapsley | 74—770 |
| 2,998,538 | 8/1961 | O'Mahoney | 74—675 X |

ARTHUR T. McKEON, Primary Examiner

U.S. Cl. X.R.

310—95